United States Patent [19]

Shelley

[11] 4,338,995
[45] Jul. 13, 1982

[54] RADIANT HEATING AND COOLING PANEL AND METHOD OF MANUFACTURING

[76] Inventor: William Shelley, 456 W. Frontage Rd., Northfield, Ill. 60093

[21] Appl. No.: 206,555

[22] Filed: Nov. 13, 1980

[51] Int. Cl.$^3$ .......................... F24D 19/00; F28F 1/22
[52] U.S. Cl. ...................................... 165/49; 165/76; 165/79; 165/171
[58] Field of Search ................... 165/171, 185, 49, 76, 165/79

[56] References Cited

U.S. PATENT DOCUMENTS

| | | | |
|---|---|---|---|
| 2,672,324 | 3/1954 | Weiss | 165/171 |
| 2,830,799 | 4/1958 | Amerio | 165/171 |
| 3,144,079 | 8/1964 | Mack | 165/171 |
| 3,786,230 | 1/1974 | Brandenburg, Jr. | 165/49 X |
| 4,022,272 | 5/1977 | Miller | 165/185 X |
| 4,080,703 | 3/1978 | Beck, Sr. | 165/171 |
| 4,098,261 | 7/1978 | Watt | 165/171 X |
| 4,187,901 | 2/1980 | Coleman et al. | 165/171 |

FOREIGN PATENT DOCUMENTS 2316245 10/1974 Fed. Rep. of Germany ...... 165/171
2324341 12/1974 Fed. Rep. of Germany ...... 165/171

*Primary Examiner*—Sheldon J. Richter
*Attorney, Agent, or Firm*—James J. Conlon

[57] ABSTRACT

A radiant panel and method of manufacturing which provides a panel construction for absorbing and emitting heat and including an extruded sheet member having a front surface and a back with the back having extruded upstanding saddles providing a concave shape adapted to receive a copper tube. A heat conducting adhesive is used to bond the copper tube to the saddle and also improve heat transfer characteristics between two members. The back surface of the panel also includes pairs of extruded channels located on each side of corresponding saddle and extending parallel therewith. A crossbrace is located transverse to the channels and held securely in place by fasteners which extend through the crossbrace and into the channels to urge the copper tube into each saddle and hold adjacent panels in a plane to provide a continuous, smooth-appearing surface on the interior of a room.

6 Claims, 4 Drawing Figures

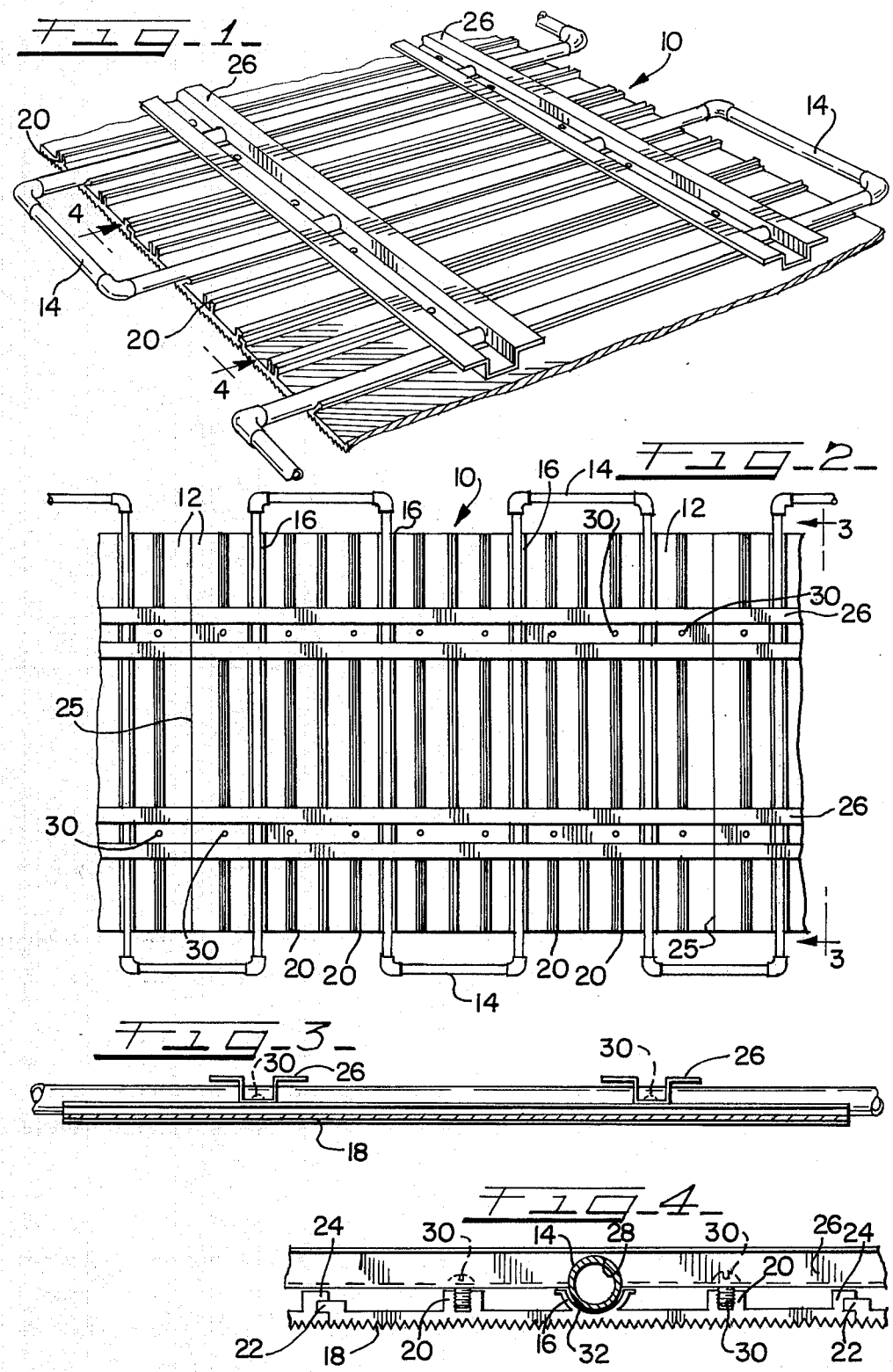

RADIANT HEATING AND COOLING PANEL AND METHOD OF MANUFACTURING

BACKGROUND OF THE INVENTION

1. Field of the Invention

This disclosure pertains to a radiant panel which may be used for both heating and cooling purposes. More specifically, this disclosure shows an extruded panel having a copper tube attached to the back surface thereof wherein a plurality of panels are held in place adjacent one another by a cross member.

2. Description of the Prior Art

The prior art radiant panel arrangements includes three types of constructions. First, the so-called tube-on-sheet configuration, provides an aluminum sheet with a copper tube soldered thereto as shown in the Beck U.S. Pat. No. 3,698,475 which describes the method of producing such a simple product. The second type of construction provides an aluminum sheet with 90° curl flange and a galvanized pipe mechanically attached to the curl flanges of the sheet and held in place by clips or other such similar mechanical devices and as described in the Baran U.S. Pat. No. 2,818,235. There is no solder or other type of metallurgical bonding between the galvanized pipe and the sheet, although at times mechanical arrangements have utilized adhesives to provide a bond between pipe or tube and aluminum sheet and to improve heat transfer characteristics between the two members.

The third type of arrangement is exemplified by the Beck U.S. Pat. No. 4,080,703 which shows an extruded aluminum panel having upstanding saddles on the back surface. The upstanding saddles receive copper tubes which are subsequently deformed at an elevated temperature to hold the tube in the saddle. Afterwards, the tube may be hydraulically expanded to the saddle contour by using a pressurized holding die on the top of the tube.

These three types of constructions have met with limited acceptance; however, because of certain problems with each of the prior art products, the search has continued for a more economical and efficient arrangement. More specifically, the so-called tube-on-sheet arrangement provides certain quality control problems to ensure that the panel is not distorted or inflicted with aesthetically undesirable surface irregularities when it is heated to the solder melting point when joining the copper tube to the aluminum sheet. The second type of arrangement, a mechanically-held tube arrangement, has met with other types of objections, but not cosmetic objections due to poor appearance. The mechanically-held galvanized pipe and aluminum sheet have not been widely accepted because the heat transfer characteristics are not sufficient enough to allow the panel to be used for both heating and cooling. The heat transfer characteristics result in a low efficiency and insufficient output. The third type of arrangement, the extruded sheet with the deformed copper tube, has also met with some objections because of the expense involved and the inability to prove the surface contact between the tube and sheet. Deforming the copper tube into the oval saddle gives rise to the question of the surface contact which cannot be proved by visible inspection. Also, the deformation of the sheet and tube occurs at an elevated temperature, above the operating temperature of the panel, thus requiring heated dies and special equipment for handling the hot panels. This type of design requires specialized equipment and results in a very expensive product.

The problems described above are overcome by the present method and produce arrangement which provides the heat transfer characteristics of the soldered tube-on-sheet panels without the distortion problems and without the high expense involved with the extruded-deformed tube arrangement.

SUMMARY OF THE INVENTION

This disclosure pertains to a radiant panel having a back surface with exposed, constant curvature saddle adapted to receive a heat transfer epoxy adhesive and a copper tube. A crossbrace has been used for connecting adjacent panels. The panels also include channel-shaped grooves to receive fasteners for connecting with the crossbrace and link adjacent, extruded panels. It is contemplated that the panels may be used individually or in groups as for a solar collector in a permanently mounted outside arrangement or may be used in combination in a room such as a hospital where it is imperative that a clean heating and/or cooling source be used to prevent contamination of a sterile area. With such an arrangement, a plurality of panels are fitted side by side, the copper tubing laid into the adhesive containing saddles in straight length or in serpentine form and then crossbraces placed atop the copper tubing so as to interconnect and securely attach the separate panels to form a rigid unit which may be inserted in the ceiling of a room, hallway or the like. The side edges of the panel include a tongue and groove type male portion on one side and a female portion on the other adapted to mate with adjacent panels and thus provide a sub-assembly of panels. These sub-assemblies may be constructed in a factory and transported to a job site and easily installed in a ceiling and allow for ease of interconnecting copper tubing between adjacent sub-assembled panel units.

In manufacturing the panels, a heat conducting, epoxy adhesive is placed in the saddles and the copper tubing is placed atop the adhesive, causing it to be displaced, and rise up the sides of the saddles and ooze out along the top of the saddle adjacent the tubing to provide a visual check that the tubing is firmly seated in the saddle and that air has been displaced. Afterwards, the crossbraces are located in place to hold down the tubing and are secured by fasteners.

It is thus an object of this disclosure to provide an extruded panel having a saddle to receive a copper tube and an extruded channel on each side of the copper tube to receive fasteners and to securely attach a crossbrace for interconnecting adjacent panels.

Another object is to provide a method of manufacturing a panel which requires no special dies or heating equipment.

These and other objects of the disclosure become apparent to those having ordinary skill in the art with reference to the following description, drawings and appended claims.

BRIEF DESCRIPTION OF THE DRAWINGS

FIG. 1 is a pictorial illustration of a number of interconnected panels;

FIG. 2 is a top plan view of a panel assembly;

FIG. 3 is a view taken generally along lines 3—3 of FIG. 2; and

FIG. 4 is a sectional view taken generally along lines 4—4 of FIG. 1.

DESCRIPTION

Referring now to the drawings and in particular to FIG. 1, there is shown a pictorial illustration showing a number of radiant panels 10. As shown in the illustrations, a radiant panel 10 includes an extruded plate portion 12 adapted to receive copper tubing designated 14. Copper tubing 14 is located in so-called saddle 16 which are generally semi-circular, U-shaped members extending the length of the panel 10 and providing a seat conforming with the outside curvature of the copper tubing. The ends of the straight portions of the copper tubes 14 are joined by shorter lengths of copper pipe to thereby form continuous lengths of pipe.

The front surface of the radiant panel 10 may include a flat, serrated or rough surface designated 18. The purpose of the serrated or rough surface is to improve the appearance of the surface by hiding irregularities and to increase the surface area of the panel thus allowing for more convective and radiant heat transfer. The groove surface also provides a decorative flat surface which appears free from all irregularities or distortions to the human eye when viewed from only a short distance.

On the inside or back side of the panel 10 there is located a number of channels 20 providing two upstanding legs spaced across a short opening and providing a trough-shaped opening between the two legs. Each leg of channel 20 has serrations or V-shaped grooves extending the length thereof. This radiant panel 10 has two side edges extending parallel with the saddles 16 and channels 20. A male edge 22, illustrated in FIG. 4, has an extension portion adapted to fit into a corresponding cutout in a female edge portion 24. As shown in FIG. 2, a number of individual panels are contemplated as being assembled as a sub-assembly of panels. The adjacent panels 10 are securely held together with crossbrace 26 to provide a smooth, continuous surface on the room side. The crossbraces 26 have a hat-shaped contour but may have any other convenient cross section. The hat-shaped contour is desirable because it provides required section strength to securely hold the panels together and also provides horizontal flange portions which permit the panels 10 to be clipped or otherwise suspended or held in place in the ceiling of a room.

The crossbrace 26 has a number of curved cutouts 28 which permit the crossbrace 26 to fit about the copper tube 14 (FIG. 4). Crossbrace 26 also includes a number of small cutouts or slots for insertion of fasteners 30 which are screwed into place in the channels 20 to thereby form a secure connection between the crossbraces and the extruded plates 12. The threads of fasteners 30 correspond with the extruded serrations in the channels 20 and securely grip the channels. Fasteners 30 may be self-tapping. As shown in FIG. 4, the crossbrace 26 is attached to be located atop the channels 20 and atop the female side edges 24. When fasteners 30 are fully threaded into channels 20, FIG. 4 shows positioning of the crossbrace just prior to it being fully seated and fully urging tube 14 into its saddle 16. Thus when fasteners 30 are tight and down, crossbrace 26 provides a self-aligning or self-leveling feature to the panel assembly. It is contemplated that the curved cutouts 28 come in contact with the tubing 14 and thus assist in holding down the tubing and provide pressure contact between the tube 14 and the panel 10.

Before the copper tubing is placed in the saddles 16, an epoxy adhesive 32 from the family of graphite based materials such as Thermon is heated and may be inserted in the seat of the saddle 16. The adhesive 32 performs three functions. First, it ensures that the copper tube is securely located in the saddle 16 by self-hardening or by baking. Secondly, and perhaps more importantly, the adhesive is highly conductive and improves the heat transfer characteristics between heat conducting fluid in tube 14, the saddle 16, and plate 12. The heat conducting fluid which passes through the copper tube 14 either heats or cools the adjacent area where the panels are installed. Thirdly, the epoxy adhesive eliminates air voids which ordinarily exist between the tube 14 and the saddle 16. For example, when the adhesive is placed in saddle 16, the tube 14 is laid in place, causing the adhesive 32 to ooze out and provide a visible check that the tube is securely seated and all air has been forced out.

Thus it has been shown by the foregoing that the panels disclosed herein provide an economical and easily installed unit which is aesthetically desirable because of the self-aligning and leveling feature provided when the crossbrace 26 is screwed into position. Also, thermal performance is improved and easily verified during fabrication by visually observing the spreading of the saddle adhesive 32 as the copper tube 14 is pressed into place.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. Radiant panel for absorbing and emitting heat the improvement comprising:
   an extruded sheet having a front surface and a back;
   a copper tube having a circular cross section;
   said sheet back having extruded, upstanding saddles means having a semi-circular, concave shape adapted to receive said copper tube;
   said copper tube having a hollow core and being constructed to carry a heat conducting fluid;
   said sheet back having extruded channels forming trough-shaped members with upstanding legs on each side of the saddle means;
   a crossbrace extending transversely of the extruded saddles and having cutout portions extending about the copper tube;
   fastener means located on the crossbrace and connecting the crossbrace to the extruded channels whereby tightening of the fastener means urges the crossbrace into restraining contact with the extruded channels to hold the legs of each channel in a plane thereby orienting the front surface of the panel in a plane to provide a smooth appearing, continuous surface.

2. The radiant panel of claim 1 wherein the extruded channels include:
   a hollow inside providing spaced, upstanding surfaces;
   said upstanding surfaces having an irregular surface adapted to cooperate with and grasp the fastener means.

3. The radiant panel of claim 2, wherein said upstanding surfaces comprise:

extruded, serrated grooves extending continuously for the length of the channels.

4. The radiant panel of claim 1 wherein said saddle comprises:
   a generally round section providing a seat conforming with the contour of said copper tube;
   a heat conducting adhesive located in the seat portion of the saddle and forming a bond connecting the tube to the seat and improving heat flow between the heat conducting fluid within the tube and the radiant panel.

5. The combination of claim 1 wherein the radiant panel means comprise:
   a plurality of individual panels forming a portion of a ceiling in a room;
   said copper tube including a plurality of straight lengths and being interconnected by end pipes and thereby forming a serpentine, continuous copper tube extending across the plurality of panels.

6. A method of manufacturing a radiant panel comprising the steps of:
   forming an extruded, aluminum panel;
   providing upstanding saddles having a generally circular, concave contour and adapted to receive a tube;
   providing the saddles with a top, terminal portion located in a first plane;
   extruding channels in the panel;
   providing the channels with a U-shaped opening with an irregular, inside surface adapted to receive a fastener;
   said upstanding channels having a top located in a plane above the top of the saddles and above the first plane;
   positioning a crossbrace across the panel and contacting the tube with the crossbrace and holding the tube in the saddle;
   fastening the crossbrace to the upstanding channels and contacting the top of the channels and orienting the top of each channel in a common plane and thereby level the connected panels;
   inserting a fastener through said crossbrace and into the associated channel;
   tightening the fastener into the channel and urging the crossbrace into the tube to hold the tube securely in the saddle;
   locating an adhesive in the saddle;
   placing a tube in the saddle;
   pressing the tube into the saddle and displacing a portion of the adhesive, causing it to rise up the saddle in contact with the saddle and tube.

* * * * *